United States Patent
Craik et al.

(10) Patent No.: US 10,078,505 B2
(45) Date of Patent: Sep. 18, 2018

(54) PARTIAL CONNECTION OF ITERATIONS DURING LOOP UNROLLING

(71) Applicant: International Business Machines Corporation, Armonk, NY (US)

(72) Inventors: Andrew J. Craik, Ontario (CA); Vijay Sundaresan, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 15/214,620

(22) Filed: Jul. 20, 2016

(65) Prior Publication Data
US 2018/0024822 A1    Jan. 25, 2018

(51) Int. Cl.
*G06F 8/41* (2018.01)

(52) U.S. Cl.
CPC ............ *G06F 8/443* (2013.01); *G06F 8/4441* (2013.01); *G06F 8/4452* (2013.01); *G06F 8/452* (2013.01)

(58) Field of Classification Search
CPC .......... G06F 8/41; G06F 8/443; G06F 8/4443; G06F 8/45; G06F 8/452; G06F 8/4452
USPC ....... 717/140, 144, 150, 151, 154, 155, 159, 717/160
See application file for complete search history.

(56) References Cited

U.S. PATENT DOCUMENTS

| | | | |
|---|---|---|---|
| 5,797,013 A | | 8/1998 | Mahadevan et al. |
| 5,862,385 A | * | 1/1999 | Iitsuka .................. G06F 8/4442 717/144 |
| 6,035,125 A | * | 3/2000 | Nguyen .................. G06F 8/452 717/160 |
| 6,170,083 B1 | * | 1/2001 | Adl-Tabatabai ........ G06F 8/443 714/E11.192 |
| 6,189,141 B1 | * | 2/2001 | Benitez ................... G06F 8/443 714/E11.209 |
| 6,938,249 B2 | * | 8/2005 | Roediger ................ G06F 8/443 714/E11.2 |
| 6,948,160 B2 | * | 9/2005 | Click ...................... G06F 8/443 717/139 |

(Continued)

OTHER PUBLICATIONS

Jovanovic, Zoran, "Software Pipelining of Loops by Pipelining Strongly Connected Components," Proceedings of the Twenty-Fourth Annual Hawaii International Conference on System Sciences, Jan. 8-11, 1991. (Year: 1991).*

(Continued)

*Primary Examiner* — Andrew M Lyons
(74) *Attorney, Agent, or Firm* — Schmeiser, Olsen & Watts, LLP; Scott Dobson

(57) ABSTRACT

A method and system for partial connection of iterations during loop unrolling during compilation of a program by a compiler. Unrolled loop iterations of a loop in the program are selectively connected, including redirecting, to the head of the loop, undesirable edges of a control flow from one iteration to a next iteration of the loop. Merges on a path of hot code are removed to increase a scope for optimization of the program. The head of the loop and a start of a replicated loop body of the loop are equivalent points of the control flow. A sequence of blocks on the path of hot code, unpolluted by a control flow of a path of cold code, is extended during the compilation. Information computed by an optimizer about the hot code in a first iteration is used to further optimize a second iteration, and the loop is further unrolled.

20 Claims, 12 Drawing Sheets

(56) References Cited

U.S. PATENT DOCUMENTS

| | | | |
|---|---|---|---|
| 6,964,043 B2 | 11/2005 | Wu et al. | |
| 7,086,043 B2* | 8/2006 | Roediger | G06F 8/443 717/130 |
| 7,086,047 B1* | 8/2006 | Edwards | G06F 8/443 717/106 |
| 7,120,907 B2 | 10/2006 | Roediger et al. | |
| 7,574,704 B2 | 8/2009 | Fulton et al. | |
| 9,015,684 B1* | 4/2015 | Koh | G06F 9/449 717/151 |
| 2003/0101444 A1* | 5/2003 | Wu | G06F 8/443 717/161 |
| 2004/0068718 A1* | 4/2004 | Cronquist | G06F 8/443 717/151 |
| 2005/0050535 A1* | 3/2005 | Roediger | G06F 8/443 717/160 |
| 2006/0101441 A1* | 5/2006 | Fulton | G06F 8/443 717/158 |
| 2011/0167416 A1* | 7/2011 | Sager | G06F 8/4442 717/149 |
| 2013/0166886 A1* | 6/2013 | Sasanka | G06F 9/30098 712/216 |
| 2015/0007182 A1* | 1/2015 | Rossbach | G06F 9/4843 718/102 |
| 2017/0220328 A1* | 8/2017 | Cui | G06F 7/4983 |
| 2018/0060049 A1* | 3/2018 | Sager | G06F 11/3648 |

OTHER PUBLICATIONS

Lavery, Daniel M. and Hwu, Wen-mei W., "Unrolling-Based Optimizations for Modulo Scheduling," Proceedings of the 28th International Symposium on Microarchitecture, Nov. 29-Dec. 1, 1995. (Year: 1995).*

Lin et al., "Thermal-aware Register Allocation with Loop Unrolling," 2010 International Conference on Computer Design and Applications, Jun. 25-27, 2010. (Year: 2010).*

Lokuciejewski, Paul and Marwedel, Peter, "Combining Worst-Case Timing Models, Loop Unrolling, and Static Loop Analysis for WCET Minimization," 21st Euromicro Conference on Real-Time Systems, Jul. 1-3, 2009. (Year: 2009).*

Tetzlaff, Dirk and Glesner, Sabine, "Static Prediction of Loop Iteration Counts Using Machine Learning to Enable Hot Spot Optimizations," 39th EUROMICRO Conference on Software Engineering and Advanced Applications, Sep. 4-6, 2013. (Year: 2013).*

Davidson et al., An Aggressive Approach to Loop Unrolling, 1995, Retrieved from Internet: URL: http://citeseerx.ist.psu.edu/viewdoc/summary?doi=10.1.1.47.9346, 36 pages.

* cited by examiner

PARTIAL CONNECTION OF ITERATIONS DURING LOOP UNROLLING

TECHNICAL FIELD

The present invention relates generally to loop unrolling in a data processing system and more specifically to profile directed loop optimizations in the data processing system.

BACKGROUND

Computationally bound workloads generally have, at their core, one or more loops which iterate over a set of data performing computations. The optimization of these core loops is key to improving application performance and has been an area of extensive study in program optimization. One well-known technique used to improve the execution performance of so-called tight loops is to replicate the code of the loop body several times in succession. The replication, or unrolling process, serves two purposes. In a first case, the replication reduces the number of backwards branches executed at runtime, which are typically expensive instructions on most processors. In a second case, the replication provides an opportunity for inter-iteration optimization to be performed.

In one example, the process of loop unrolling, in a traditional form, as performed in a runtime dynamic system considers loops to be unrolled by exactly replicating the loop bodies and connecting the replicated loop bodies. Another example is directed toward reducing an amount of code that must be duplicated when unrolling a loop by only unrolling 'hot' traces. This means that all loop iterations branch to the same control code, which merges into the control flow of the unrolled loop at the bottom of the unrolled loop. This technique while reducing code size does not expose many optimization opportunities because of the control flow being merged at the bottom of the loop. A typical problem with traditional unrolling techniques is that all loop back-edges become inter-iteration edges connecting the unrolled loop sequences during loop unrolling. This limitation can reduce optimization opportunities because information associated with rarely executed parts of each iteration must be considered when optimizing the next unrolled loop iteration.

SUMMARY

The present invention provides a method, and associated computer system and computer program product, for partial connection of iterations during loop unrolling during compilation of a program by a compiler. One or more processors of a computer system selectively connect, during the compilation, unrolled loop iterations of a loop in the program, wherein the selectively connecting unrolled loop iterations comprises redirecting, to the head of the loop, edges of a control flow for the program that are classed as undesirable from one iteration of the loop to a next iteration of the loop, and wherein the head of the loop and a start of a replicated loop body of the loop are equivalent points of the control flow for the program. The one or more processors remove, during the compilation, merges on a path of hot code in the loop to increase a scope for optimization of the program. The one or more processors extend, during the compilation, a sequence of blocks on the path of hot code, unpolluted by a control flow of a path of cold code, wherein information computed by an optimizer in or invoked by the compiler about the hot code in a first iteration of the loop is used to further optimize a second iteration of the loop, and wherein the loop is further unrolled.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
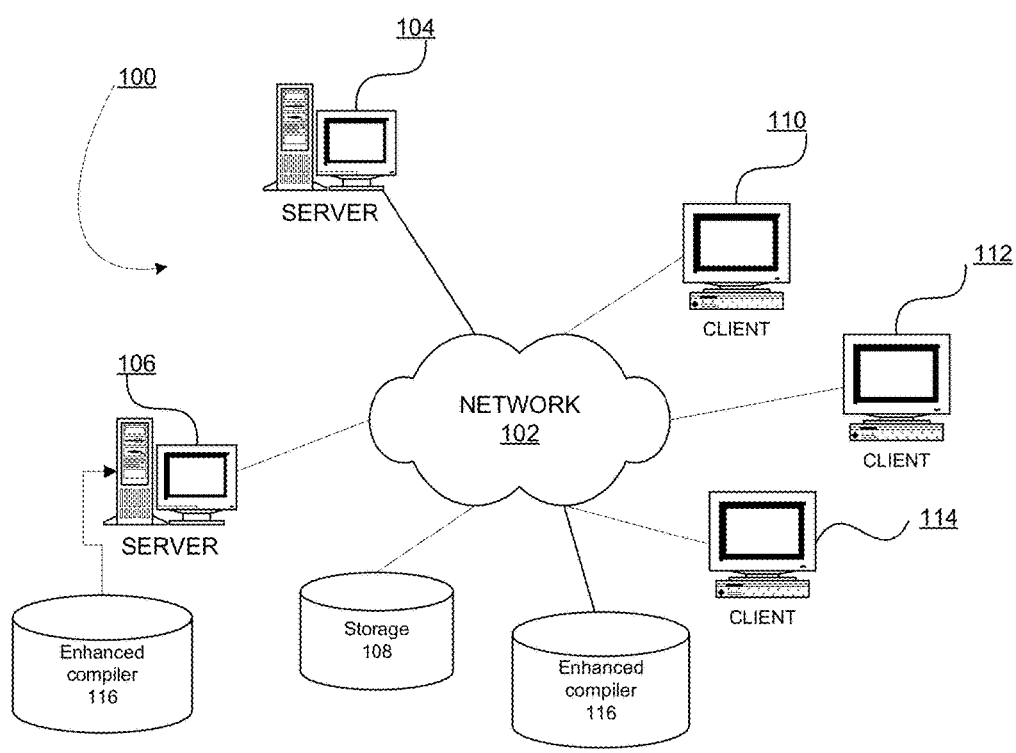
FIG. 1 depicts a pictorial representation of a network of a data processing system, in accordance with embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention improves functioning of a computer, by improving optimization of compiling a program executable by one or more processors of the computer.

FIG. 1 depicts a pictorial representation of a network data processing system 100, in accordance with embodiments of the present invention. Network data processing system 100 is a computer system comprising a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In FIG. 1, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, including thousands of commercial, governmental, educational and other computer systems that route data and messages. Network data processing system 100 also may be implemented as a number of different types of networks, such as for example, an intranet, a local area network (LAN), or a wide area network (WAN). FIG. 1 is intended as an example network data processing system, and not as an architectural limitation for the different illustrative embodiments.

Figure 2:
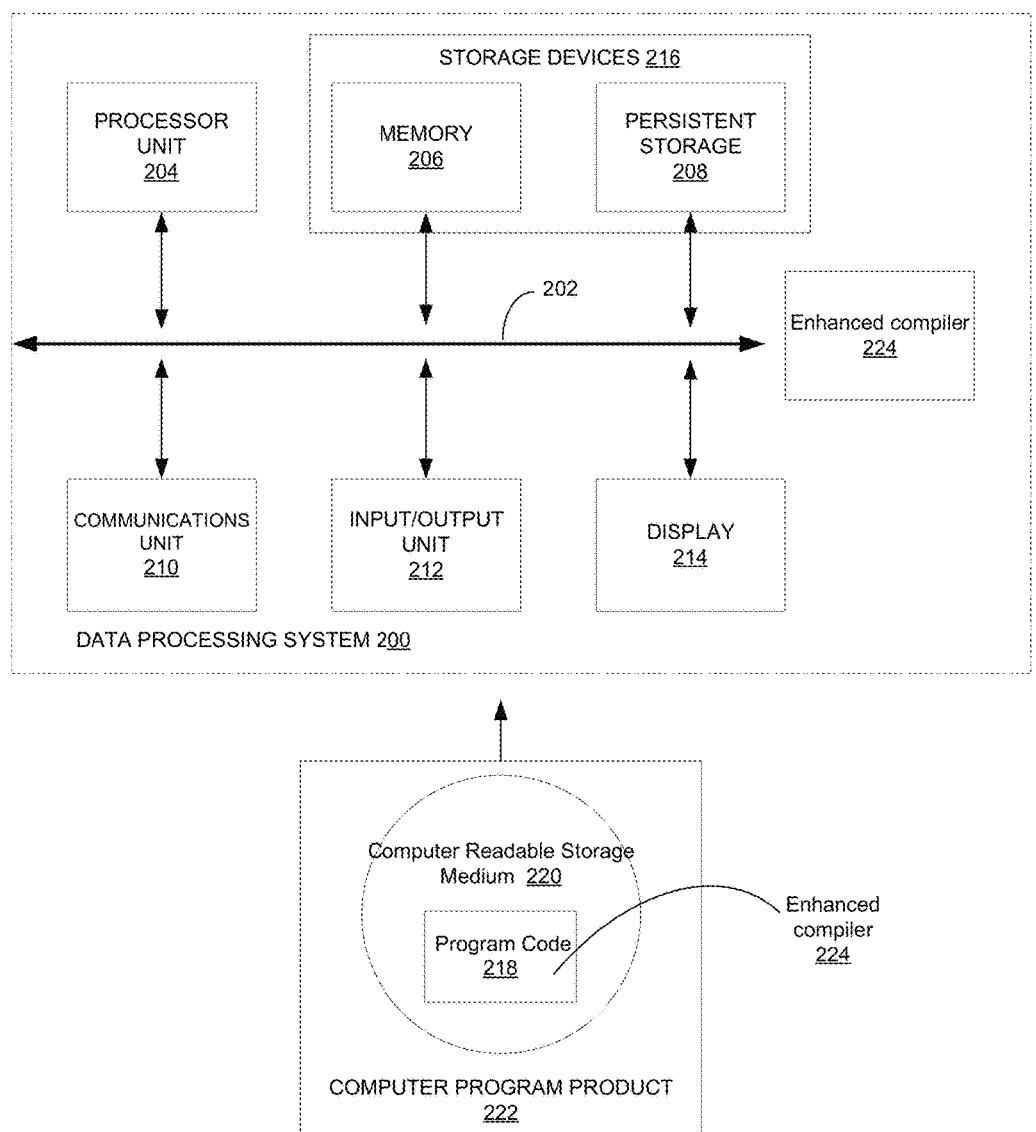
FIG. 2 is a block diagram of an exemplary data processing system, in accordance with embodiments of the present invention.

FIG. 2 is a block diagram of an exemplary data processing system 200, in accordance with embodiments of the present invention. Data processing system 200 includes communications fabric 202, which is a communications interface that provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is a hardware device that is capable of storing information, such as, for example without limitation, data, program code in functional form, and/or other suitable information either on a temporary basis and/or a permanent basis. Memory 206, in these examples, may be, for example, a random access memory (RAM), a read only memory (ROM), or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in one embodiment, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media or a computer readable data storage device. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

An embodiment of the present invention expands the capability of IBM Java 8 SRI FP 10. The embodiment of the invention describes a novel and beneficial technique to increase the scope and impact of compiler optimization in a context of loop unrolling, utilizing profiling information to remove merges. While there are existing techniques that describe how to create long sequences of blocks without merges, embodiments of the current invention are able to remove merges completely on the hot path. The removal of merges greatly increases the scope for optimization and further enables removal of expensive runtime method tests and other calculations typically resulting in significantly improved performance. Loop optimizations and unrolling are well-researched areas but embodiments of the invention typically offer significant performance improvements with relatively few drawbacks and are particularly valuable for dynamic languages including Java® but also for scripting languages that are becoming increasingly important.

Embodiments of the present invention recognize the control flow equivalence of the loop header and the start of each unrolled loop iteration. Embodiments of the invention exploit this control flow equivalence by selectively connecting unrolled loop iterations. This selective connecting reduces a number of control flow merges from cold paths, and as a result increases the opportunities for program optimization. A secondary benefit is a potential reduction in the code growth caused by the unrolling.

Embodiments of the present invention are an extension to existing loop unrolling technologies, and recognize that a head (or equivalently, "header") of the loop and a start of a replicated loop body are control-flow equivalent points. This means that these program points are interchangeable and loop optimization opportunities can be increased by selectively connecting unrolled loop iterations. Embodiments of the present invention further realize any control flow edges from one iteration to the next iteration that are classed as undesirable can be safely redirected to the head of the loop, which enables side-effects of calls and other arbitrary control-flow to be constrained to a small, usually infrequently executed, region of the loop enabling more frequently executed regions to be improved by the compiler and the consequent optimizations in the compiled program.

Using data processing system 200 of FIG. 2 as an example, a computer-implemented process for partial connection of iterations during loop unrolling is presented. Processor unit 204 recognizes, using a compiler, in a context of loop unrolling technologies that a head of a loop and a start of a replicated loop body are equivalent points of a control flow for a program, and therefore respective program points are interchangeable. Processor unit 204 selectively connects unrolled loop iterations, wherein edges of the control flow that are classed as undesirable from one iteration of the loop to a next iteration of the loop are redirected to the head of the loop. Processor unit 204 removes merges on a path of hot code to increase a scope for optimization. Processor unit 204 extends a sequence of blocks on the path of hot code, unpolluted by a control flow of a path of cold code. The information computed by processor unit 204, using an optimizer, associated with the hot code in a first iteration is used to further optimize a second iteration. Processor unit 204 further unrolls the loop.

Hot code and cold code refer to respective portions of a program in which the hot code is executed much more frequently than the cold code.

Figure 3:
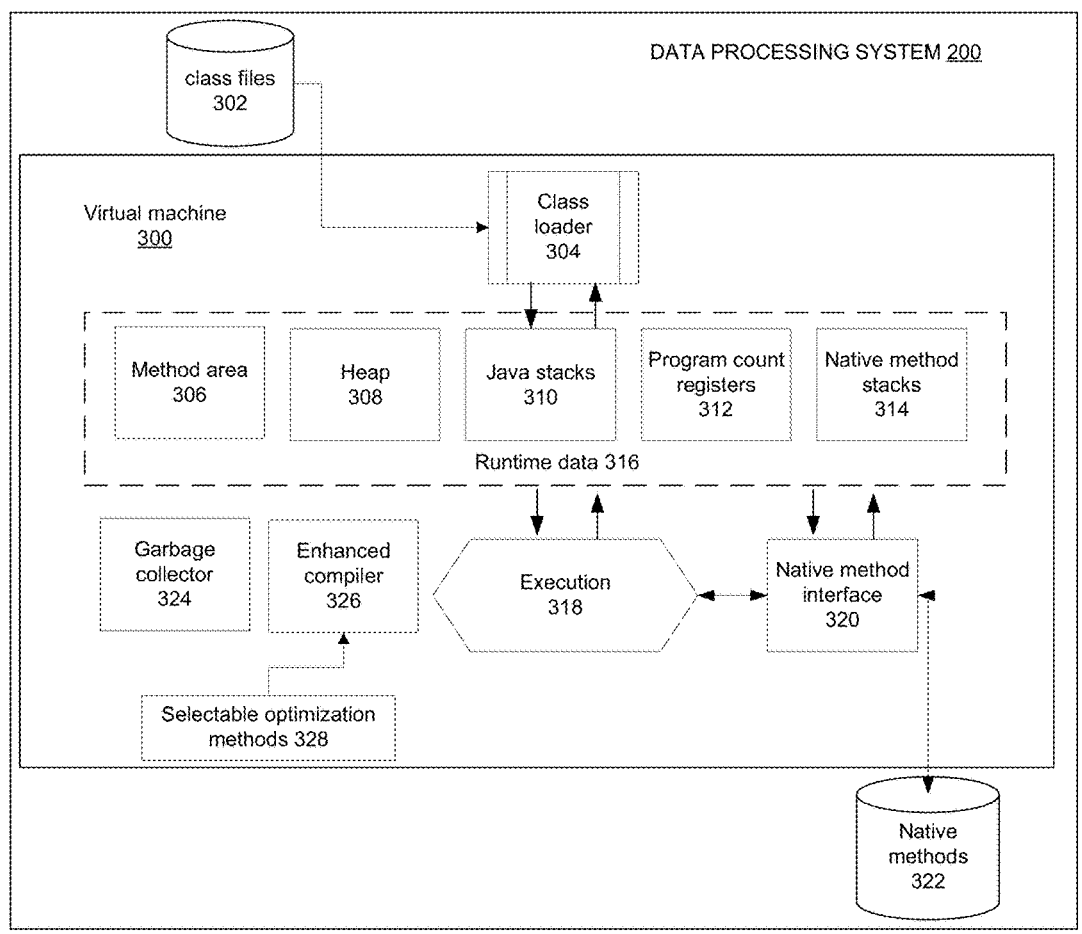
FIG. 3 is a block diagram representation of an enhanced compilation system, in accordance with embodiments of the present invention.

FIG. 3 is a block diagram of an enhanced compilation system 300, in accordance with embodiments of the present invention. Enhanced compilation system 300 is an example of an enhanced compiler used in a Java virtual machine environment according to an embodiment of the present invention. Components of enhanced Java virtual machine 300, include, but are not limited to class loader 304, method area 306, heap 308, Java stacks 310, program count registers 312, native stacks 314, runtime data 316, execution 318, native method interfaces 320, garbage collector 324, enhanced compiler 326 and selectable optimization methods 328. Class files 302 and native methods 322, are data structures used in conjunction with enhanced Java virtual machine 300, but are not 'within' enhanced compilation system 300 as are the previously stated components. These previously stated components represent the important subsystems and memory areas of a typical Java virtual machine.

Class loader 304 is a component of a Java virtual machine that provides a mechanism for loading the types, which are classes and interfaces, using fully qualified names. Class files 302 are therefore loaded into enhanced compilation system 300 for processing using class loader 304.

Runtime data 316 represents space in memory used to store data comprising, inter alia, bytecodes, information extracted from previously loaded class files, objects instantiated by an executing program, parameters provided to methods, return values associated with executing programs, and local variables associated with executing programs. Enhanced compilation system 300 typically organizes memory used to execute programs into a number of runtime data areas comprising method area 306, heap 308, Java stacks 310, program count registers 312, and native stacks 314.

Method area 306 represents a memory area that is shared by all threads running inside enhanced compilation system 300. When enhanced compilation system 300 loads a particular class file, the particular class file is parsed for information about a type from the binary data contained within the class file. The type information is loaded into method area 306. During program execution, enhanced compilation system 300 stores all program instantiated objects onto heap 308.

Program counter registers 312, and Java stacks 310 are assigned to a new thread when the new thread is created. When the thread is executing a Java method, rather than a 'native method,' a value of program counter registers 312 is the next instruction for the thread to execute. Java stacks 310 store the state of Java method invocations, but not the 'native method,' invocations for the thread. The state of a Java method invocation typically includes local variables, invocation parameters, a return value when available and any intermediate calculation results from the method. Because the Java virtual machine does not have registers to hold data values as intermediate data, Java stacks 310 are used. The state of 'native method' invocations is stored in an implementation-dependent way in native stacks 314, and implementation-dependent memory areas.

Execution 318 represents an execution component or processing component that provides a capability for executing the instructions contained in the methods of classes, loaded by class loader 304.

Native method interfaces 320, provide a capability to the enhanced compilation system 300 to use native methods 322 which are written using a Java programming language and may have platform specific data or processing requirements. Access to the native methods 322 therefore requires use of native method interfaces 320 to enable processing using execution 318.

Garbage collector 324 is special component, which uses a process of reviewing current allocations of heap memory. Garbage collector 324 identifies which particular objects in the heap memory are in use and which particular objects in the heap memory are not in use. Objects identified as not in use are candidates for removal. Garbage collector 324 deletes the unused objects. Garbage collector 324 typically operates on a predetermined schedule or may also be automated to initiate cleaning activity when heap usage exceeds a predetermined threshold. Objects identified as in use or referenced imply that a program still maintains a pointer to that object, and the object should remain in the heap.

Enhanced compiler 326 is a runtime component providing a capability of dynamic translation, which is compilation during execution of a program rather than prior to the execution. Typically enhanced compiler 326 is a just-in-time compiler (JIT) that translates the Java bytecode to platform specific machine code. The run time compilation may be viewed as a combination of ahead-of-time compilation (AOT), and interpretation. JIT compilation provides speed of compiled code with flexibility of an interpretation. However JIT compilers also come with overhead of using the interpreter and additional overhead of compiling.

Selectable optimization methods 328 comprises a set of predetermined technologies for transforming program code input from a 'basic' form into a corresponding better performing variation of the 'basic' form. For example, a selected type of loop processing including loop unrolling may generate the better performing variation. In a further example, loop unrolling may include more than one form of loop unrolling from which one is selected and applied to transform the 'basic' form. The technologies are typically expressed in predefined algorithms implemented within or as extensions to enhanced compiler 326.

Figure 4:
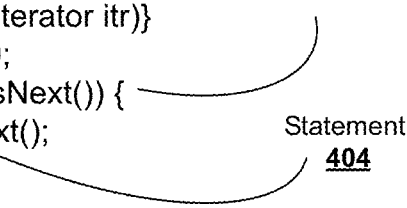
FIG. 4 is a textual representation of a code snippet of a program, in accordance with embodiments of the present invention.

FIG. 4 is a textual representation of a code snippet 400 of a program, in accordance with embodiments of the present invention. The operation of an embodiment of the present invention is conveyed using a small example program. Code snippet 400 is an example program of a small loop counting a number of elements in a Java collection. Method hasNext 402 and method next 404 are method invocations that are interface dispatches.

Figure 5:
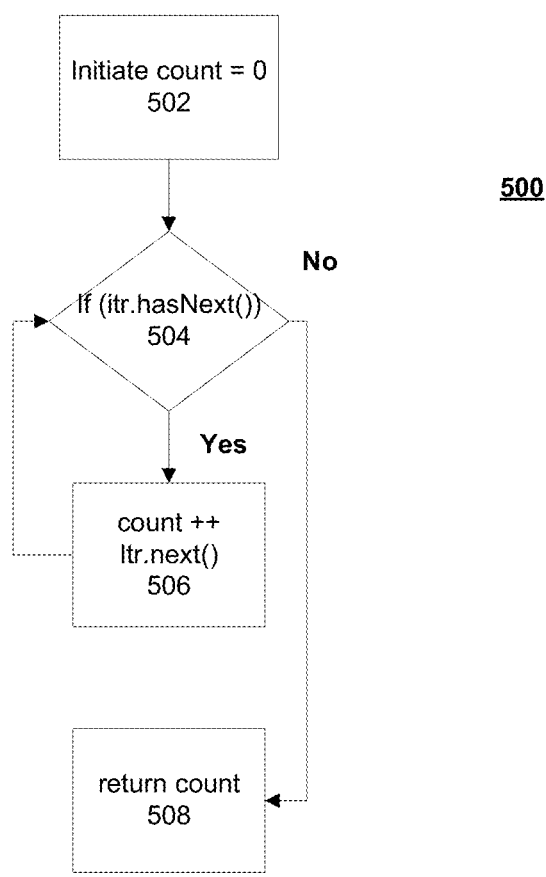
FIG. 5 is a diagram of a control flow graph of the code snippet of the program of FIG. 4, in accordance with embodiments of the present invention.

FIG. 5 is a diagram of a control flow graph 500 of the code snippet 400 of the program of FIG. 4, in accordance with embodiments of the present invention. Control flow graph 500 is representative of code snippet 400 of FIG. 4 after compilation of the program.

An optimizing Java compiler will attempt to identify the most likely receiver type for the iterator itr to identify candidate implementations of hasNext 402 and next 404 to inline into the function body previously shown in code snippet 400 of FIG. 4. Assuming candidate implementations can be identified, the enhanced compiler will inline the most likely implementations with checks to make sure that the inlined implementations are safe to execute. Whenever an inline implementation is not safe to execute, an appropriate fallback method will be called to be executed instead of the unsafe inline implementation. This safety check is typically referred to as a virtual guard. In general, the compiler will make an assumption that the inlined code is expected to run and that fallback method calls will be rarely executed.

Block 502 initiates a count to a value of 0. Block 504 represents a first condition in which it is determined whether an element in the Java collection is present and if so a count is increased in block 506, and if not processing flows to block 508. Block 506 further determines whether more elements exist (not explicitly shown in FIG. 5) and if so loops back to block 504 again, and if not processing flows to block 508. Block 508 returns the count and exits the code snippet to connect with the rest of the program.

Figure 6:
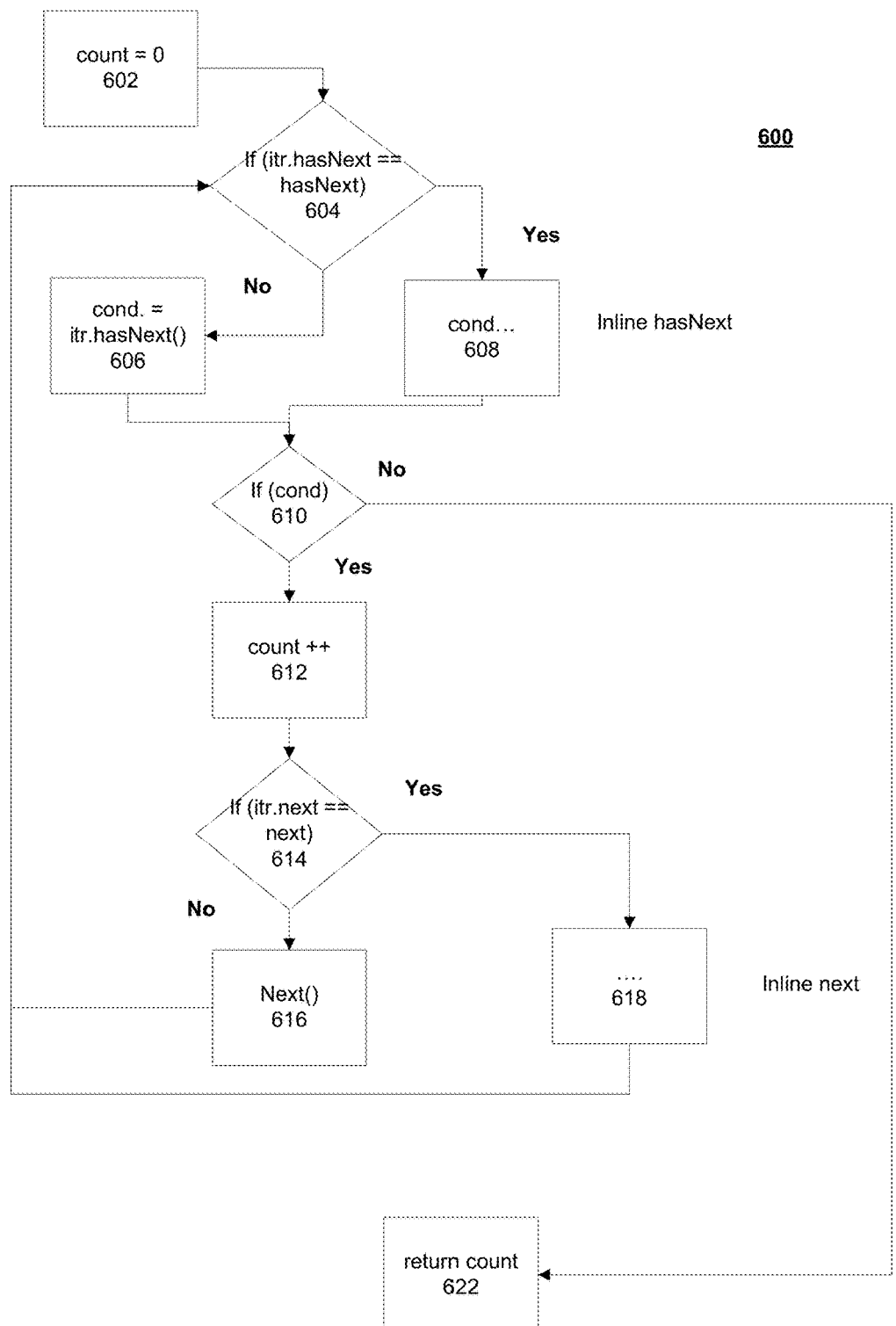
FIG. 6 is a diagram of a control flow graph after inlining a loop of FIG. 5, in accordance with embodiments of the present invention.

FIG. 6 is a diagram of a control flow graph 600 after inlining the loop of FIG. 5, in accordance with embodiments of the present invention. Program loop 600 is an example of respective portions of the program loop in the example program of code snippet 400 of FIG. 4 after a process of inlining code is performed.

Block 602 initializes a count to a value of 0. Block 604 makes a determination as to whether an element in the Java collection is present and if not block 606 identifies a condition as not safe for the method hasNext 402 and the appropriate method will be called, and if so block 608 identifies the condition as being safe for inlined code for the method hasNext 402. Block 610 makes a determination as to whether an element is obtained and if so, processing flows to block 612 which increments the count value by 1, and if not, processing flows to block 622 to complete the processing and return a value for the count. Block 614 makes a determination as to whether the method is next 404 and if not block 616 identifies the condition as the method next 404, and if so block 618 identifies the condition as being inlined code for the method next 404. Block 616 and block 618 provide a merge point on returning to the loop head directly at block 604 making manipulating partial edge redirection easier.

Figure 7:
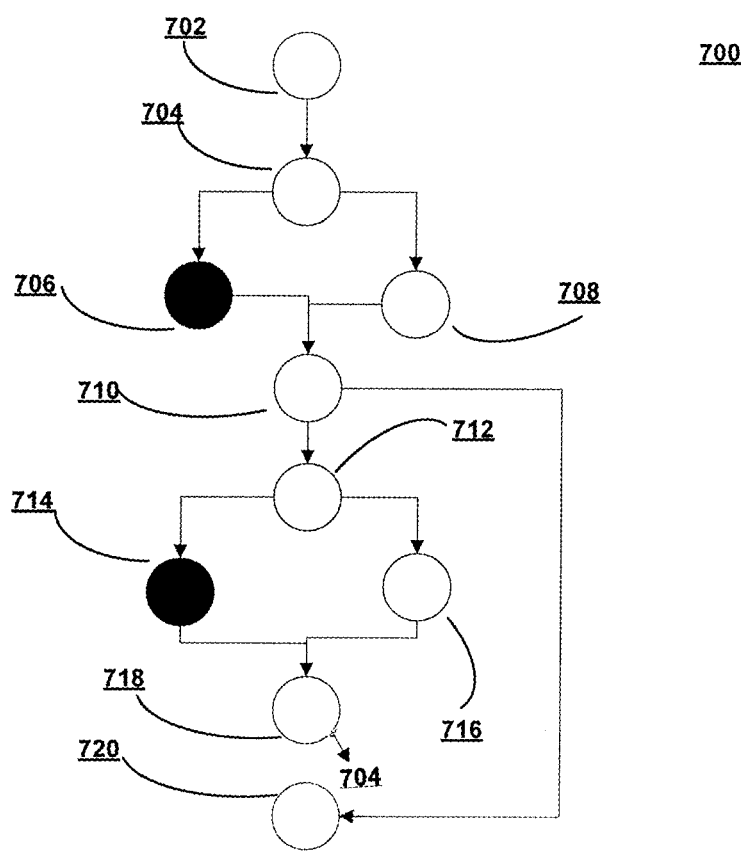
FIG. 7 is a diagram of a control flow graph after inlining a loop of FIG. 6, in accordance with embodiments of the present invention.

FIG. 7 is a diagram of a control flow graph 700 after inlining a loop of FIG. 6, in accordance with embodiments of the present invention. In FIG. 7, as well as in FIGS. 8-10, the solid black nodes in alternative paths from a decision node denote hot code, whereas the white (i.e., unblackened) nodes in alternative paths from a decision node represent cold code. For example, in FIG. 8 nodes 806, 810, 814 and 818 in a first path from decision node 804 are hot nodes, whereas nodes 808, 812, 816 and 820 in a second path from decision node 804 are cold nodes.

Node 702 is representative of block 602 of FIG. 6, while node 704 is representative of block 604, in which a determination is made resulting in one of two paths being taken. A more frequently taken path is from node 704 to node 706 to node 710. A less frequently used path is from node 704 to node 708 to node 710.

In a second portion of the loop, the more frequently taken path proceeds from node 710 through node 712 to node 714 and to node 718, and then back to node 704, which mirrors the process of the left side of control flow graph 600 of FIG. 6. The less frequently used path continues from node 710 to node 712 to node 716 and to node 718 before returning back to node 704 from node 718. Node 710 corresponds to block 610 of FIG. 6. The less frequently used path mirrors the process shown on the right side of control flow graph 600 of FIG. 6.

Figure 8:
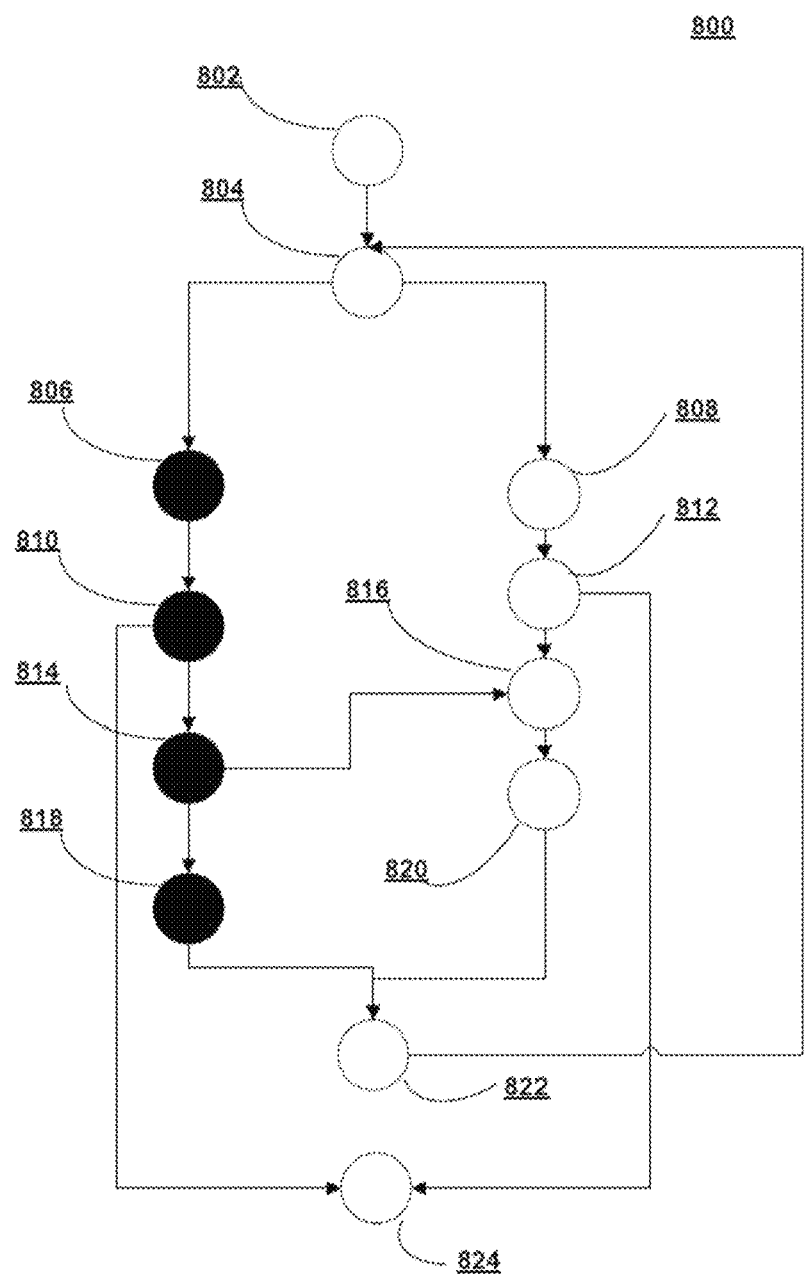
FIG. 8 is a diagram of a control flow graph after simple optimization of the loop of FIG. 7, in accordance with embodiments of the present invention.

Some simple, standard optimizations can be applied to the loop as shown in FIG. 7 to create a frequently executed block sequence also referred to as a 'hot' sequence and a rarely executed block sequence also referred to as a 'cold' sequence as shown in a control flow diagram in FIG. 8.

FIG. 8 is a diagram of a control flow graph 800 after simple optimization of the loop of FIG. 7, in accordance with embodiments of the present invention. Control flow graph 800 is an example of loop 600 of FIG. 6 after a process of inlining and after performing one or more optimizations.

A frequently executed block sequence referred to as a 'hot' sequence is depicted in a path through nodes 802, 804, 806, 810, 814, 818 and 822. A less frequently executed block sequence referred to as a 'cold' sequence is depicted in a path through nodes 802, 804, 808, 812, 816, 820 and 822. Forward branching in the hot sequence is represented in the flows from node 814 to node 816 processing. Forward branching out from node 810 and 812 to node 824 represent results of conditional processing at the respective program points of node 810 and node 812. Backward branching in the merge sequence is represented in the flow from node 822 to return to node 804.

Figure 9:
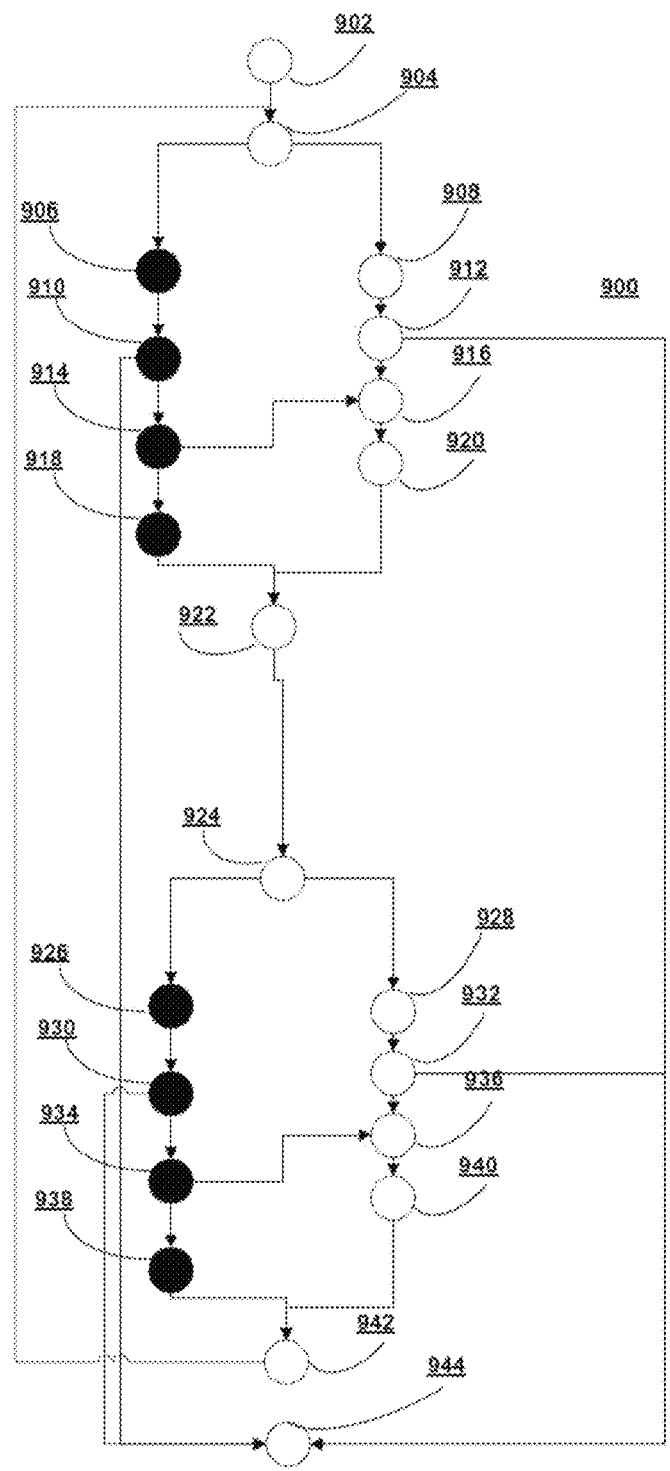
FIG. 9 is a diagram of a control flow graph after unrolling the loop of FIG. 8, in accordance with embodiments of the present invention.

FIG. 9 is a diagram of a control flow graph 900 after unrolling the loop of FIG. 8, in accordance with embodiments of the present invention. Control flow 900 is an example of the loop of FIG. 8 after performing an inlining process and after performing one or more optimizations and after performing unrolling.

A frequently executed block sequence is depicted in a flow through an upper portion of the control flow graph comprising nodes 902, 904, 906, 910, 914, 918 and 922. The frequently executed block sequence is depicted in a further flow through a lower portion of control flow graph 900 comprising nodes 926, 930, 934, 938, 942. Forward branching in the hot sequence is represented in the flows from node 910 and node 930 to node 944. Backward branching in the hot sequence is represented in the merge of the control flow at 938 and 940 to node 942 and the flow from node 942 to return to node 904.

A less frequently executed block sequence is depicted in a flow through an upper portion of the control flow graph comprising nodes 902, 904, 908, 912, 916, 920 and 922. The less frequently executed block sequence is depicted in a further flow through a lower portion of control flow graph 900 comprising nodes 924, 928, 932, 936, 940, and 942. Forward branching in the cold sequence is represented in the flows from node 912 and node 932 to node 944, and in the hot sequence from node 914 to node 916 and node 934 to node 936.

In control flow 900, the unrolling causes the hot control flow sequences and the cold control flow sequences to merge through a merge at nodes 922 and 942. Embodiments of the invention recognize when connecting the exit block of the first iteration to the entry block of the second iteration that the entry block of the first iteration is a control flow equivalent point to the entry block of the second iteration. As a result, edges from the first iteration can be selectively redirected from the second iteration to the entry of the first iteration.

Figure 10:
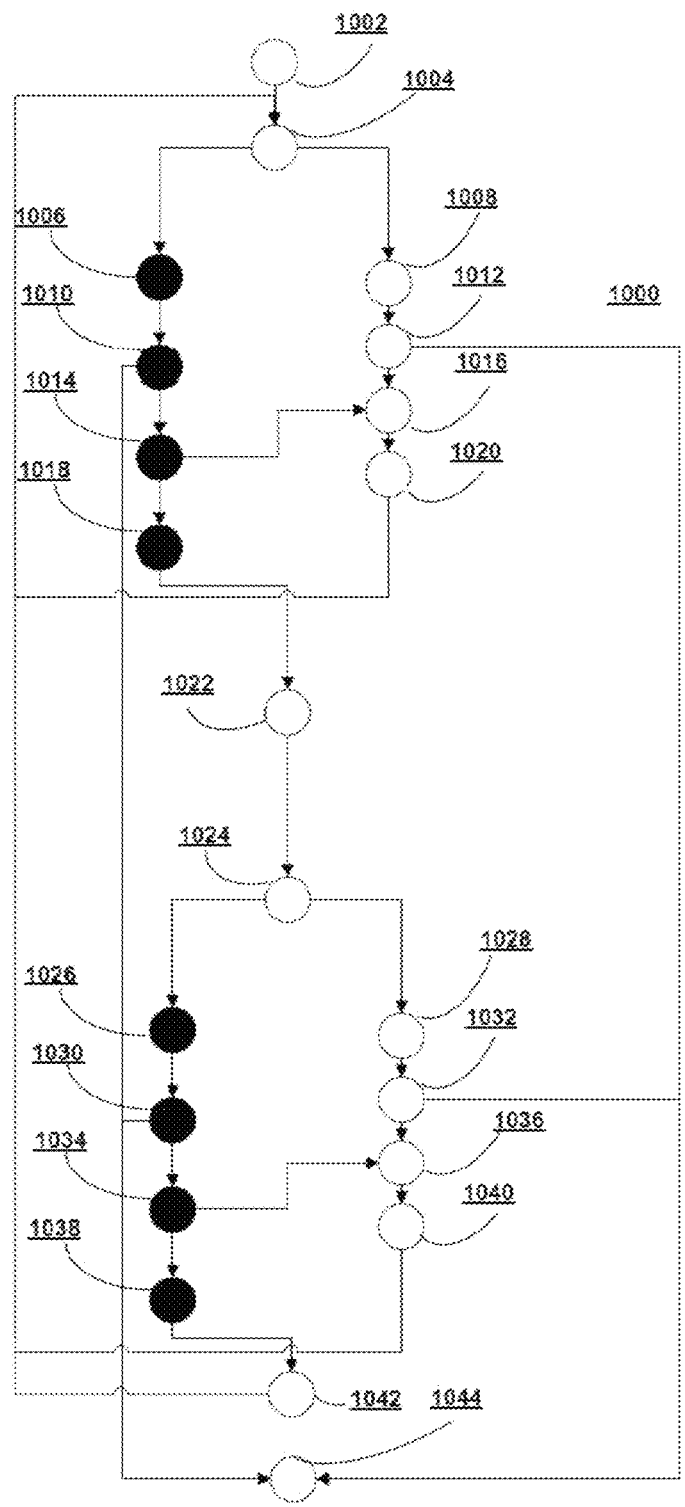
FIG. 10 is a diagram of a control flow graph after a subsequent unrolling the loop of FIG. 9, in accordance with embodiments of the present invention.

FIG. 10 is a diagram of a control flow graph 1000 after a subsequent unrolling the loop of FIG. 9, in accordance with embodiments of the present invention. Control flow graph 1000 is an example of using a heuristic that redirects cold control flow edges to the loop header and hot edges connect to the next iteration.

This segregation of control flow allows the information that the optimizer computes about the hot code sequence of the first iteration to be used to further optimize the second, unrolled iteration. The benefits of this technique are especially non-obvious when considering that speculative inlining in dynamic languages, such as Java, is very common and that cold code often contains calls or other control flow constructs which greatly complicate program analysis.

A typical assumption is that a call could modify almost every value in the program and, as a result, the call limits an ability to safely optimize a respective program. A frequently executed block sequence is depicted in a flow through a first iteration in an upper portion of control flow graph 1000 comprising nodes 1002, 1004, 1006, 1010, 1014, 1018. However the path does not proceed to node 1022 (as was the case in control flow 900 of FIG. 9). Rather the path now proceeds back to node 1004 from node 1018. The frequently executed block sequence is not merged with the cold sequence, which is an unobvious innovation of the present invention.

The frequently executed block sequence is depicted in a further flow through a lower portion of control flow graph 1000 comprising nodes 1026, 1030, 1034, and 1038. However the frequently executed block sequence does not flow to node 1042. Rather the path now proceeds back to node 1004 from node 1038. The frequently executed block sequence is again not merged with the cold sequence, which is an unobvious innovation of the present invention.

Forward branching in the hot sequence is represented in the flows from node 1010 and node 1030 to node 1044. Backward branching in the hot sequence is represented in the flow from node 1018 and node 1038 to return to node 1004.

A less frequently executed block sequence is depicted in a flow through a first iteration in an upper portion of control flow graph 1000 comprising nodes 1002, 1004, 1008, 1012, 1016, 1020. However the path does not merge at node 1022 (as was the case in control flow 900 of FIG. 9). Rather the path now proceeds to node 1002. The less frequently executed block sequence is not merged with the hot sequence of the first iteration, which is an unobvious innovation of the present invention.

The less frequently executed block sequence is depicted in a further flow through a lower portion of control flow graph 1000 comprising nodes 1024, 1028, 1032, 1036, 1040 and 1042. The less frequently executed block sequence flows from node 1040 back to node 1004. The less frequently executed block sequence of the lower portion of control flow graph 1000 is not merged with the hot sequence, which is an unobvious innovation of the present invention.

Forward branching in the cold sequence is represented in the flows from node 1012 and node 1032 to node 1044 as well as from node 1014 of the hot sequence to node 1016 and node 1034 of the hot sequence to node 1036.

By relegating the cold paths to return to the loop header instead of merging with the hot paths, a long extended sequence of hot blocks unpolluted by a cold control flow is formed. The long extended sequence of hot blocks unpolluted by a cold control flow results in much greater optimization opportunities and significantly improved program performance.

Figure 11:
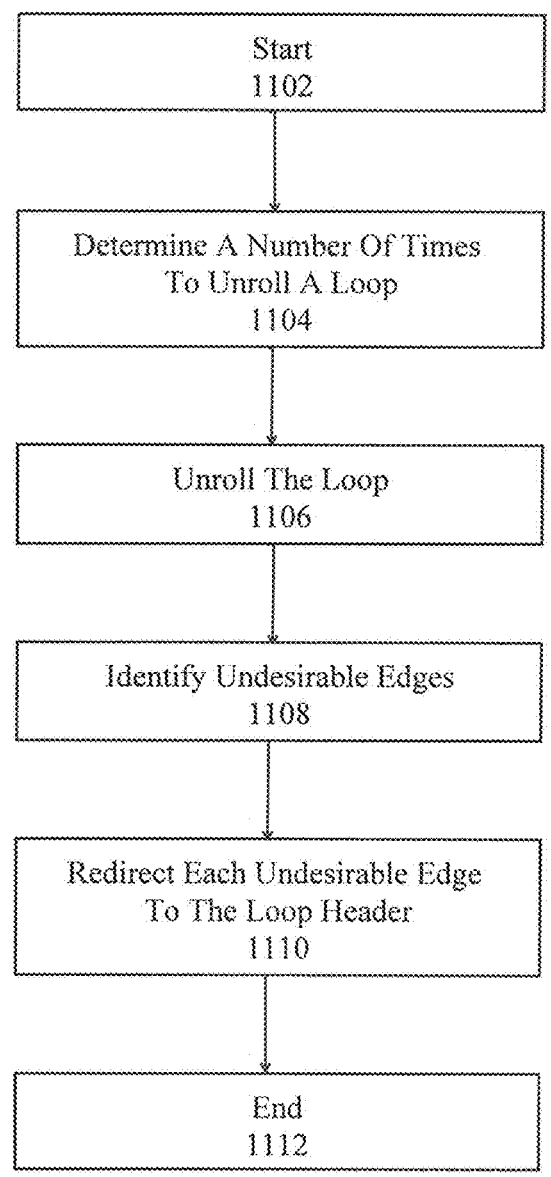
FIG. 11 is a flowchart of a process for partial connection of iterations during loop unrolling using the enhanced compilation system of FIG. 3, in accordance with embodiments of the present invention.

FIG. 11 is a flowchart of a process 1100 for partial connection of iterations during loop unrolling using the enhanced compilation system of FIG. 3, in accordance with embodiments of the present invention. Process 1100 is an example of process using an embodiment of the enhanced compilation system 300 of FIG. 3.

Process 1100 begins (step 1102) and determines a number of times to unroll the loop (step 1104) using, in one embodiment, a Java Virtual Machine, as subsequently described in the description of step 1108. Process 1100 unrolls the loop using standard unrolling techniques (step 1106).

Process 1100 identifies undesirable edges to the iteration exit block (step 1108), by comparing an inputted execution frequency of executing an edge in the program against an inputted frequency threshold (which may be, inter alia, 5%, 10%, 15%, 20%, 25%, 30%, etc) in one embodiment. If the execution frequency of executing the edge is determined in block 1108 to exceed the frequency threshold, then the edge is desirable; otherwise the edge is undesirable. In one embodiment, the inputted execution frequency of executing each edge and the inputted frequency threshold may be inputted to the optimizer of the inventive compiler. The execution frequency of executing the edges may be determined, in one embodiment, in a process prior to implementing the invented method, by interpreting a program by an interpreter inside a Java Virtual Machine to obtain details, from the interpreter, of control flow branching and other logic of the program, and the details obtained from the interpreter may be analyzed to determine the execution frequency of executing the edges. Execution frequencies from the interpreter, with respect to a specified threshold, may be used to identify hot code and cold code in the program. Information obtained from interpreting the program in the Java Virtual Machine may be used to determine the number of times to unroll the loop in step 1102; thus, in one embodiment, the number of times to unroll the loop may be an input to the optimizer of the inventive compiler.

In another embodiment, process 1100 identifies undesirable edges using predetermined criteria comprising paths of the control flow containing virtual calls, a failed side of a runtime inlined method guard, and paths which throw and catch exceptions. Each undesirable edge determination in the preceding another embodiment may be independently implemented either prior to execution of the compiler or during execution of the compiler to compile the program.

Process 1100 redirects each undesirable edge to a loop header (step 1110). Process 1100 repeats the redirection for each iteration.

Figure 12:
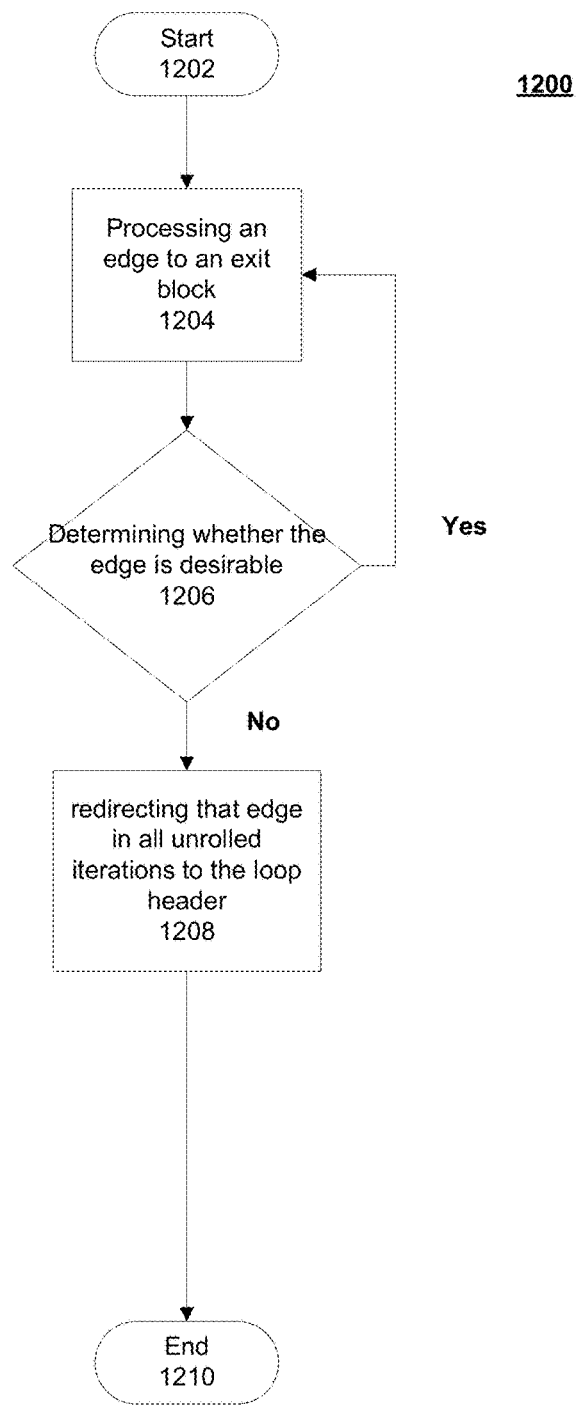
FIG. 12 is a flowchart of a process for partial connection of iterations during loop unrolling using an enhanced compilation system, in accordance with embodiments of the present invention.

FIG. 12 is a flowchart of a process for partial connection of iterations during loop unrolling using an enhanced compilation system, in accordance with embodiments of the present invention. Process 1200 is an example of process using an embodiment of the enhanced compilation system 300 of FIG. 3.

Process 1200 begins (step 1202) and processes an edge to an exit block (step 1204). Process 1200 determines whether the edge is desirable or undesirable (step 1206). In response to a determination in step 1206 that the edge is undesirable, process 1200 redirects the edge in all unrolled iterations to the loop header (step 1208) and terminates thereafter (step 1210). In response to a determination that the edge is desirable, process 1200 returns to step 1204 for processing as before.

Thus is presented in an illustrative embodiment a computer-implemented process for partial connection of iterations during loop unrolling. In a context of loop unrolling technologies a compiler recognizes that a head of a loop and a start of a replicated loop body are equivalent points of a control flow for a program, and therefore the respective program points are interchangeable. Unrolled loop iterations are selectively connected so that edges of the control flow that are classed as undesirable from one iteration of the loop to a next iteration of the loop are redirected to the head of the loop.

Merges on a path of hot code are removed to increase a scope for optimization. A sequence of blocks on the path of hot code, unpolluted by a control flow of a path of cold code, is extended. The information computed by an optimizer about the hot code in a first iteration is used to further optimize a second iteration, and the loop is further unrolled. Extending the sequence of the blocks on the path of hot code, unpolluted by a control flow of a path of cold code provides for a longer series of blocks in which to optimize the code. As a result the compilation can typically be generated to produce a more efficient output series of blocks. Therefore the state of the art is improved over previous solutions when using an embodiment of the computer-implemented process for partial connection of iterations during loop unrolling, as currently recited.

In another illustrative embodiment, a computer-implemented process for partial connection of iterations during loop unrolling, in a context of loop unrolling technologies, recognizes a head of a loop and a start of a replicated loop body are control flow equivalent points, and that the respective program points are interchangeable. The computer-implemented process selectively connects unrolled loop iterations, wherein any control flow edges from one iteration of the loop to the next iteration of the loop that are classed as undesirable are redirected to the head of the loop. The computer-implemented process removing merges on a hot path to increase the scope for optimization and enable removal of runtime method tests. The side effects of calls and other arbitrary control-flow are constrained to an infrequently executed, region of the loop. A sequence of hot blocks unpolluted by cold control-flow, is extended. The information an optimizer computes in association with the hot code in a first iteration is used to further optimize a second iteration and as a result the loop is further unrolled.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

A computer program product of the present invention comprises one or more computer readable hardware storage devices having computer readable program instructions stored therein, said program instructions executable by one or more processors to implement the methods of the present invention.

A computer system of the present invention comprises one or more processors, one or more memories, and one or more computer readable hardware storage devices, said one or more hardware storage device containing program instructions executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for partial connection of iterations during loop unrolling during compilation of a program by a compiler, said method comprising:
    selectively connecting, by one or more processors of a computer system during the compilation, unrolled loop iterations of a loop in the program, wherein said selectively connecting unrolled loop iterations comprises redirecting, to the head of the loop, edges of a control flow for the program that are classed as undesirable from one iteration of the loop to a next iteration of the loop, and wherein the head of the loop and a start of a replicated loop body of the loop are equivalent points of the control flow for the program;
    removing, by the one or more processors during the compilation, merges on a path of hot code in the loop to increase a scope for optimization of the program; and
    extending, by the one or more processors during the compilation, a sequence of blocks on the path of hot code, unpolluted by a control flow of a path of cold code, wherein information computed by an optimizer in or invoked by the compiler about the hot code in a first iteration of the loop is used to further optimize a second iteration of the loop, and wherein the loop is further unrolled.

2. The method of claim 1, wherein selectively connecting unrolled loop iterations comprises:
    connecting an exit block of the first iteration to an entry block of the second iteration, wherein the entry block of the first iteration is an equivalent point of the control flow to the entry block of the second iteration, and wherein edges from the first iteration are selectively redirected from the second iteration to the entry block of the first iteration.

3. The method of claim 1, wherein said selectively connecting unrolled loop iterations comprises:
    classifying the edges of the control flow as undesirable using predetermined criteria comprising cold or rarely executed paths, paths of the control flow containing calls and calls including virtual calls, failed side of a runtime inlined method guard, and paths which throw and catch exceptions.

4. The method of claim 1, wherein said extending a sequence of blocks on the path of hot code comprises:
    removing runtime method tests;
    constraining side-effects of the calls and predetermined elements of the control flow to a region of the loop executed less than a predetermined number of times relative to other respective regions of the loop; and
    modifying, by the optimizer, regions of the loop executed more than a predetermined number of times relative to the other respective regions of the loop.

5. The method of claim 1, wherein the hot code comprises code blocks for which most of an execution time of the program is spent, and code blocks which are executed more often relative to other code blocks in the program, and wherein the cold code comprises code blocks for which less of the execution time of the respective program is spent, relative to the other code blocks in the respective program and code blocks which are executed less often relative to other code blocks in the respective program.

6. The method of claim 1, wherein said loop unrolling is performed with respect to a language selected from the group consisting of a managed runtime language, a scripting environment language, and a procedural language.

7. The method of claim 1, wherein said redirecting comprises redirecting edges of the control flow associated with the cold path to the loop header and edges of the control flow associated with the hot path to connect to the next iteration to form a segregation of the control flow that enables the information computed by the optimizer about a hot code sequence of the first iteration to further optimize the second, unrolled iteration.

8. A computer program product, comprising one or more computer readable hardware storage devices having computer readable program instructions stored therein, said program instructions executable by one or more processors of a computer system to implement a method for partial connection of iterations during loop unrolling during compilation of a program by a compiler, said method comprising:
    selectively connecting, by the one or more processors during the compilation, unrolled loop iterations of a loop in the program, wherein said selectively connecting unrolled loop iterations comprises redirecting, to the head of the loop, edges of a control flow for the program that are classed as undesirable from one iteration of the loop to a next iteration of the loop, and wherein the head of the loop and a start of a replicated loop body of the loop are equivalent points of the control flow for the program;
    removing, by the one or more processors during the compilation, merges on a path of hot code in the loop to increase a scope for optimization of the program; and
    extending, by the one or more processors during the compilation, a sequence of blocks on the path of hot code, unpolluted by a control flow of a path of cold code, wherein information computed by an optimizer in or invoked by the compiler about the hot code in a first iteration of the loop is used to further optimize a second iteration of the loop, and wherein the loop is further unrolled.

9. The computer program product of claim 8, wherein selectively connecting unrolled loop iterations comprises:
    connecting an exit block of the first iteration to an entry block of the second iteration, wherein the entry block of the first iteration is an equivalent point of the control flow to the entry block of the second iteration, and wherein edges from the first iteration are selectively redirected from the second iteration to the entry block of the first iteration.

10. The computer program product of claim 8, wherein said selectively connecting unrolled loop iterations comprises:
   classifying the edges of the control flow as undesirable using predetermined criteria comprising cold or rarely executed paths, paths of the control flow containing calls and calls including virtual calls, failed side of a runtime inlined method guard, and paths which throw and catch exceptions.

11. The computer program product of claim 8, wherein said extending a sequence of blocks on the path of hot code comprises:
   removing runtime method tests;
   constraining side-effects of the calls and predetermined elements of the control flow to a region of the loop executed less than a predetermined number of times relative to other respective regions of the loop; and
   modifying, by the optimizer, regions of the loop executed more than a predetermined number of times relative to the other respective regions of the loop.

12. The computer program product of claim 8, wherein the hot code blocks for which most of an execution time of the program is spent, and code blocks which are executed more often relative to other code blocks in the program, and wherein the cold code comprises code blocks for which less of the execution time of the respective program is spent, relative to the other code blocks in the respective program and code blocks which are executed less often relative to other code blocks in the respective program.

13. The computer program product of claim 8, wherein said loop unrolling is performed with respect to a language selected from the group consisting of a managed runtime language, a scripting environment language, and a procedural language.

14. The computer program product of claim 8, wherein said redirecting comprises redirecting edges of the control flow associated with the cold path to the loop header and edges of the control flow associated with the hot path to connect to the next iteration to form a segregation of the control flow that enables the information computed by the optimizer about a hot code sequence of the first iteration to further optimize the second, unrolled iteration.

15. A computer system, comprising one or more processors, one or more memories, and one or more computer readable hardware storage devices, said one or more hardware storage device containing program instructions executable by the one or more processors via the one or more memories to implement a method for partial connection of iterations during loop unrolling during compilation of a program by a compiler, said method comprising:
   selectively connecting, by the one or more processors during the compilation, unrolled loop iterations of a loop in the program, wherein said selectively connecting unrolled loop iterations comprises redirecting, to the head of the loop, edges of a control flow for the program that are classed as undesirable from one iteration of the loop to a next iteration of the loop, and wherein the head of the loop and a start of a replicated loop body of the loop are equivalent points of the control flow for the program;
   removing, by the one or more processors during the compilation, merges on a path of hot code in the loop to increase a scope for optimization of the program; and
   extending, by the one or more processors during the compilation, a sequence of blocks on the path of hot code, unpolluted by a control flow of a path of cold code, wherein information computed by an optimizer in or invoked by the compiler about the hot code in a first iteration of the loop is used to further optimize a second iteration of the loop, and wherein the loop is further unrolled.

16. The computer system of claim 15, wherein selectively connecting unrolled loop iterations comprises:
   connecting an exit block of the first iteration to an entry block of the second iteration, wherein the entry block of the first iteration is an equivalent point of the control flow to the entry block of the second iteration, and wherein edges from the first iteration are selectively redirected from the second iteration to the entry block of the first iteration.

17. The computer system of claim 15, wherein said selectively connecting unrolled loop iterations comprises:
   classifying the edges of the control flow as undesirable using predetermined criteria comprising cold or rarely executed paths, paths of the control flow containing calls and calls including virtual calls, failed side of a runtime inlined method guard, and paths which throw and catch exceptions.

18. The computer system of claim 15, wherein said extending a sequence of blocks on the path of hot code comprises:
   removing runtime method tests;
   constraining side-effects of the calls and predetermined elements of the control flow to a region of the loop executed less than a predetermined number of times relative to other respective regions of the loop; and
   modifying, by the optimizer, regions of the loop executed more than a predetermined number of times relative to the other respective regions of the loop.

19. The computer system of claim 15, wherein the hot code blocks for which most of an execution time of the program is spent, and code blocks which are executed more often relative to other code blocks in the program, and wherein the cold code comprises code blocks for which less of the execution time of the respective program is spent, relative to the other code blocks in the respective program and code blocks which are executed less often relative to other code blocks in the respective program.

20. The computer system of claim 15, wherein said redirecting comprises redirecting edges of the control flow associated with the cold path to the loop header and edges of the control flow associated with the hot path to connect to the next iteration to form a segregation of the control flow that enables the information computed by the optimizer about a hot code sequence of the first iteration to further optimize the second, unrolled iteration.

* * * * *